United States Patent
Chan et al.

(10) Patent No.: US 8,184,451 B2
(45) Date of Patent: May 22, 2012

(54) FIXING STRUCTURE FOR ELECTRONIC CARD

(75) Inventors: Kao-Feng Chan, Taipei (TW);
Yung-Chih Kuo, Taipei (TW);
Chien-Feng Chu, Taipei (TW)

(73) Assignee: Compal Electronics, Inc., Taipei (TW)

( * ) Notice: Subject to any disclaimer, the term of this patent is extended or adjusted under 35 U.S.C. 154(b) by 305 days.

(21) Appl. No.: 12/700,676

(22) Filed: Feb. 4, 2010

(65) Prior Publication Data

US 2010/0265670 A1 Oct. 21, 2010

Related U.S. Application Data

(60) Provisional application No. 61/170,108, filed on Apr. 17, 2009.

(51) Int. Cl.
*H05K 7/14* (2006.01)
*H05K 7/18* (2006.01)

(52) U.S. Cl. ........................................ 361/801

(58) Field of Classification Search ............... 361/807, 361/810, 731; 439/945, 946, 631
See application file for complete search history.

(56) References Cited

U.S. PATENT DOCUMENTS

| | | | |
|---|---|---|---|
| 6,529,386 B2 * | 3/2003 | Boe | 361/801 |
| 6,793,536 B2 * | 9/2004 | Takeyama et al. | 439/631 |
| 7,004,764 B2 * | 2/2006 | Boudreau et al. | 439/74 |
| 7,315,458 B1 * | 1/2008 | Lin | 361/807 |
| 7,335,032 B1 * | 2/2008 | Lee | 439/76.1 |
| 7,430,129 B1 * | 9/2008 | Peng | 361/807 |
| 7,467,963 B2 | 12/2008 | Chen | |
| 7,554,815 B2 * | 6/2009 | Hardt et al. | 361/753 |
| 2008/0298040 A1 * | 12/2008 | Lee | 361/809 |

FOREIGN PATENT DOCUMENTS

TW M335053 6/2008

* cited by examiner

*Primary Examiner* — Lisa Lea Edmonds
*Assistant Examiner* — Xanthia C Cunningham
(74) *Attorney, Agent, or Firm* — Jianq Chyun IP Office

(57) ABSTRACT

A fixing structure for an electronic card is suitable for mounting a long electronic card or a short electronic card within a housing. The fixing structure includes a pressing plate, a locking slice, and a locking member. Two ends of the pressing plate have two buckling portions. The locking slice connects an end of the pressing plate and has a locking hole. Besides, the locking slice leans against the housing. The locking member passes through the locking hole and is fixed into a first fixing hole or a second fixing hole. When the locking hole corresponds to the first fixing hole, the two buckling portions are fixed onto a free end of the long electronic card. When the locking hole is corresponding to the second fixing hole, the two buckling portions are fixed onto a free end of the short electronic card.

11 Claims, 4 Drawing Sheets

FIXING STRUCTURE FOR ELECTRONIC CARD

CROSS-REFERENCE TO RELATED APPLICATION

This application claims the priority benefit of U.S. provisional application Ser. No. 61/170,108, filed on Apr. 17, 2009. The entirety of the above-mentioned patent application is hereby incorporated by reference herein and made a part of specification.

BACKGROUND OF THE INVENTION

1. Field of Invention

The invention relates to a fixing structure for an electronic card. More particularly, the invention relates to a fixing structure capable of fixing two standards of electronic cards.

2. Description of Related Art

In most cases, only one card socket for inserting a conventional electronic card, e.g. a wireless network interface card (WNIC), is installed in a notebook computer. However, with continuous development of the electronic cards having miniaturized chips, e.g. 3G network cards, video cards, and so on, two sets of card sockets are installed in the computer for inserting two electronic cards. In addition, to economize the space within the computer, one single socket housing is provided to accommodate two electronic cards ranged in an up/down parallel manner.

In this case, screws are frequently employed to directly secure the two electronic cards onto a motherboard. When the lower electronic card is completely inserted, the upper electronic card is inserted into the upper card socket. Locking holes at free ends that are corresponding to inserted ends of the upper and the lower electronic cards are aligned, and therefore the two electronic cards can be secured onto the motherboard with screws directly passing through the locking holes of the two electronic cards. Nevertheless, after the upper electronic card is inserted, whether the locking hole of the upper electronic card is aligned to the locking hole of the lower electronic card is not apt to be observed with naked eyes. Hence, screwing the electronic cards may sometimes result in structural damage.

Besides, as stated above, more and more electronic cards with the miniaturized chips have evolved, and thus not only the electronic cards with standard lengths (commonly known as long electronic cards) but also the electronic cards with relative short lengths (commonly known as short electronic cards) are developed. Given that the long electronic card is inserted into the lower card socket, and that the short electronic card is inserted into the upper card socket, the locking holes of the short electronic card and the long electronic card are bound to be misaligned. Accordingly, how to design a fixing structure for fixing the electronic cards with different dimensions is an open issue to be resolved in haste.

SUMMARY OF INVENTION

The invention is directed to a fixing structure for fixing two standards of electronic cards.

In the invention, a fixing structure for an electronic card is provided. The fixing structure is suitable for mounting a long electronic card or a short electronic card within a housing. The fixing structure includes a pressing plate, a locking slice, and a locking member. Two ends of the pressing plate have two buckling portions. The locking slice connects one end of the pressing plate and has a locking hole. The locking slice leans against the housing. The locking member passes through the locking hole and is fixed onto a first fixing hole or a second fixing hole of the housing. When the locking hole corresponds to the first fixing hole, the two buckling portions are fixed onto a free end of the long electronic card. By contrast, when the locking hole corresponds to the second fixing hole, the two buckling portions are fixed onto a free end of the short electronic card.

According to an embodiment of the invention, the pressing plate and the locking slice are integrally formed by a plate body.

According to an embodiment of the invention, the housing has a groove in which a socket housing is installed for accommodating the long electronic card and the short electronic card.

According to an embodiment of the invention, the socket housing has a first socket and a second socket, and the long electronic card and the short electronic card are inserted into the first socket and the second socket in a parallel manner.

According to an embodiment of the invention, the free end of the short electronic card is buckled by the pressing plate and fixed by the locking slice when the short electronic card is superposed on the long electronic card.

According to an embodiment of the invention, the free end of the long electronic card is buckled by the pressing plate and fixed by the locking slice when the long electronic card is superposed on the short electronic card.

According to an embodiment of the invention, the two buckling portions individually have a first horizontal surface and a first vertical surface respectively buckled on an upper surface and a side surface of the long electronic card or respectively buckled on an upper surface and a side surface of the short electronic card.

According to an embodiment of the invention, the upper surface of the long electronic card or the upper surface of the short electronic card has two cavities. The first horizontal surface of each of the two buckling portions has a protrusion respectively corresponding to one of the two cavities, such that the protrusion is buckled into the corresponding one of the two cavities.

According to an embodiment of the invention, the locking slice has a second horizontal surface and a second vertical surface. The second vertical surface is connected to the first horizontal surface of one of the two buckling portions, and the locking hole passes through the second horizontal surface.

According to an embodiment of the invention, the long electronic card is a WNIC or a video card.

According to an embodiment of the invention, the short electronic card is a WNIC or a video card.

Based on the above, two standards of electronic cards can be fixed by applying the fixing structure of the invention. Thereby, the defect that the locking holes of the two conventional standards of electronic cards cannot be aligned and screwed when the two electronic cards are placed in an up/down parallel manner can be rectified. Besides, the original structural design is not changed when the fixing structure of the invention is applied, thus facilitating the use of devices applying the fixing structure of the invention.

It is to be understood that both the foregoing general descriptions and the following detailed embodiments are exemplary and are, together with the accompanying drawings, intended to provide further explanation of technical features and advantages of the invention.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
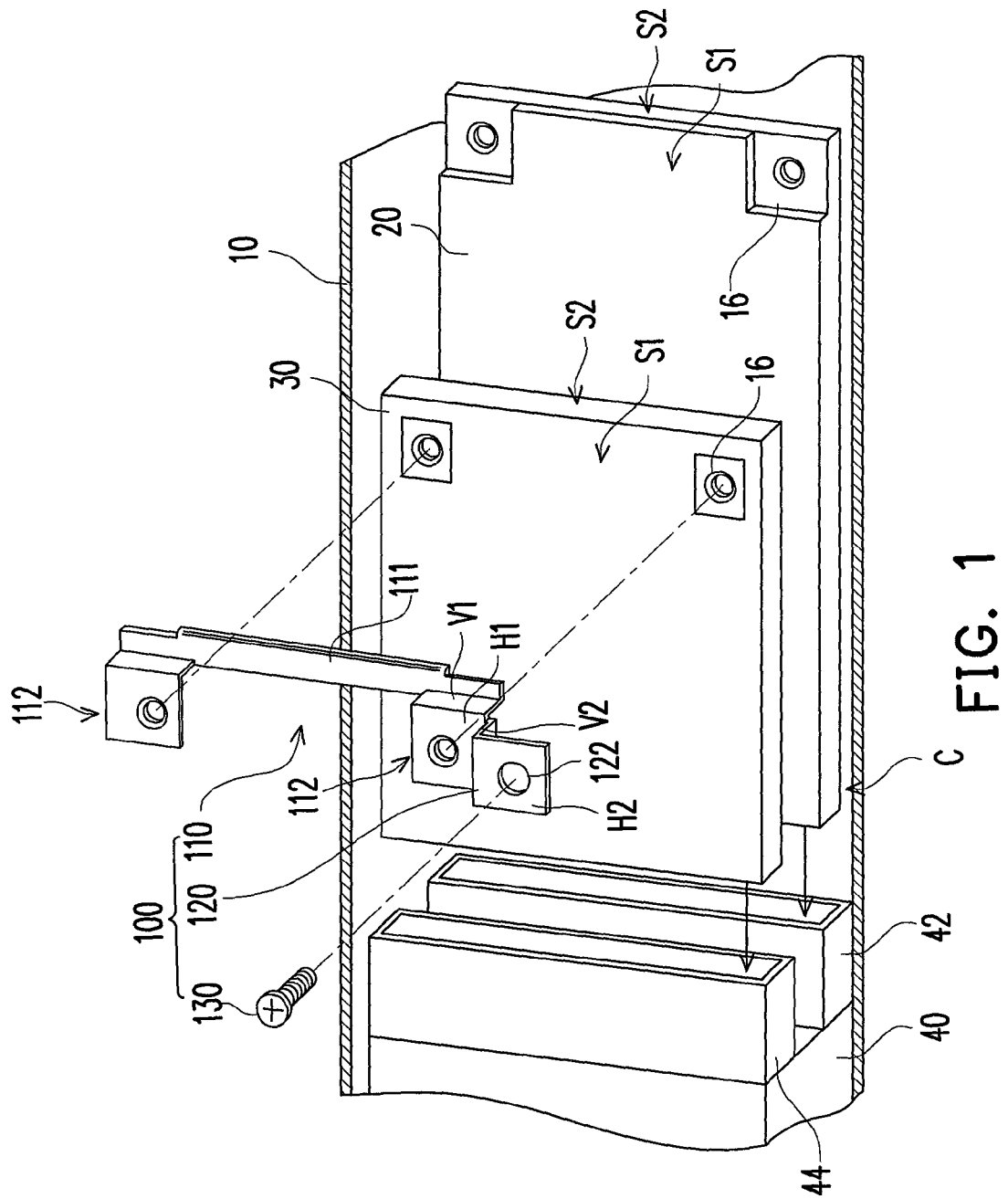
FIG. 1 is a schematic view illustrating a fixing structure for an electronic card according to an embodiment of the invention.
Figure 2:
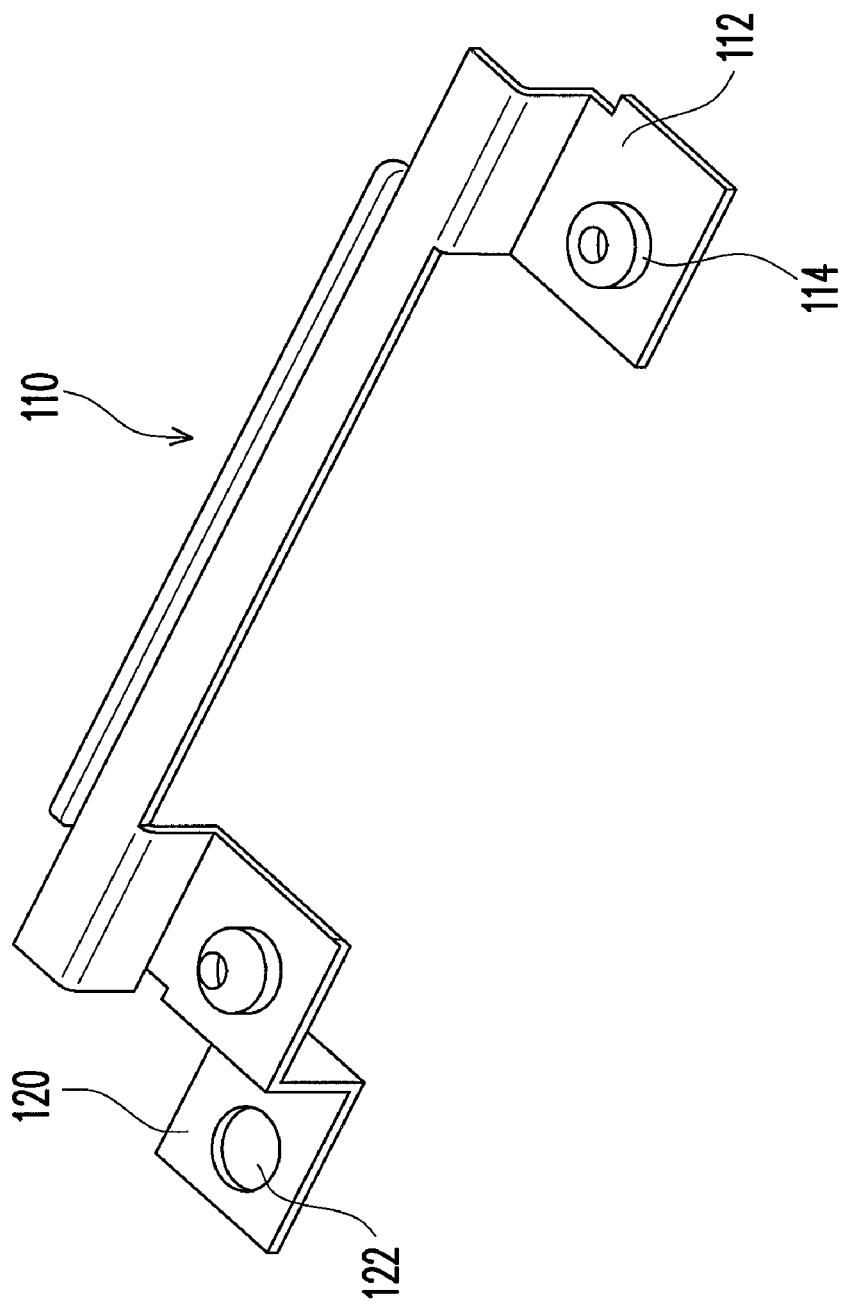
FIG. 2 is a schematic bottom view illustrating the fixing structure depicted in FIG. 1.
Figure 3:
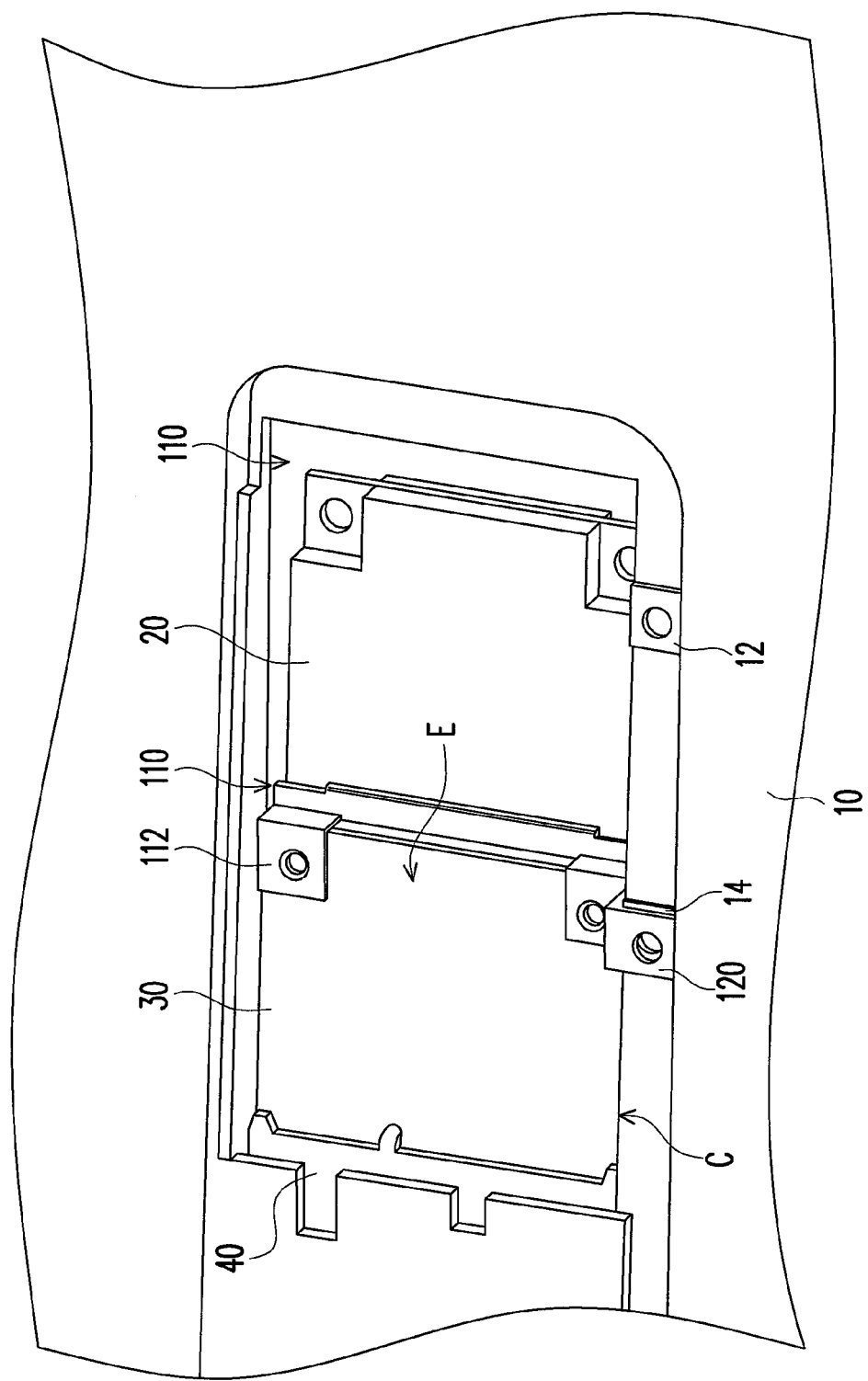
FIGS. 3 and 4 are schematic views respectively illustrating the fixing structure mounted onto a short electronic card and a long electronic card.
Figure 4:
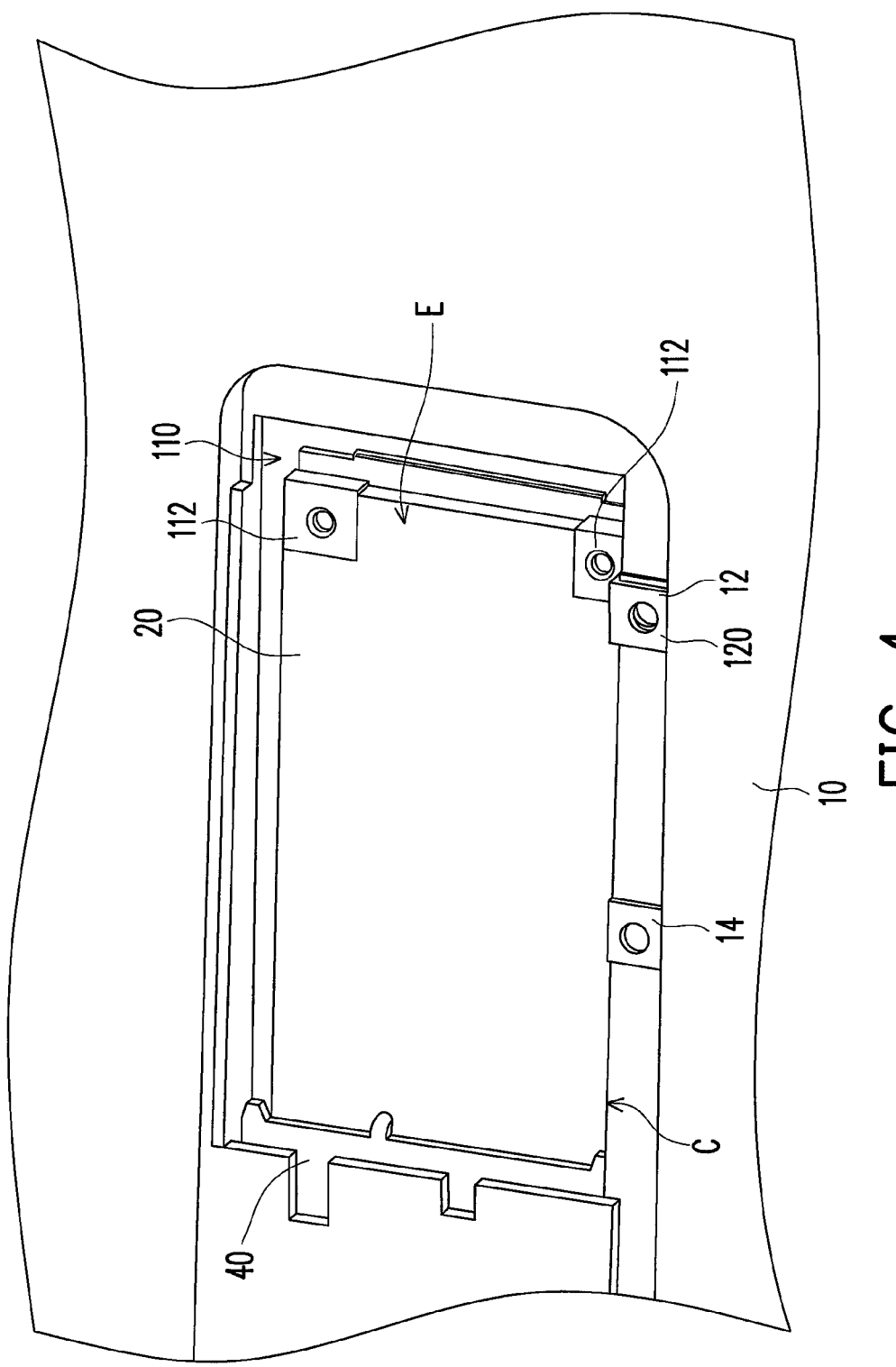

FIG. 1 is a schematic view illustrating a fixing structure for an electronic card according to an embodiment of the invention. FIG. 2 is a schematic bottom view illustrating the fixing structure depicted in FIG. 1. FIGS. 3 and 4 are schematic views respectively illustrating the fixing structure mounted onto a short electronic card and a long electronic card.

As indicated in FIGS. 1 to 4, a fixing structure 100 for an electronic card includes a pressing plate 110, a locking slice 120, and a locking member 130. Two ends of a rod 111 of the pressing plate 110 have two buckling portions 112 arranged in an L shape, for example. The pressing plate 110 and the locking slice 120 are integrally formed by a plate body, for instance. The locking slice 120 connects an end of the pressing plate 110 and has a locking hole 122. The locking member 130 passes through the locking hole 122 and is fixed into a first fixing hole 12 or a second fixing hole 14 of a housing 10, as indicated in FIGS. 3 and 4. To be more specific, the buckling portions 112 respectively have a first horizontal surface H1 and a first vertical surface V1 intersecting to each other at an angle of 90 degrees. Besides, the first horizontal surface H1 and the first vertical surface V1 are respectively buckled on an upper surface S1 and a side surface S2 of an electronic card (a long electronic card 20 or a short electronic card 30). In addition, the upper surface S1 of the long electronic card 20 or the upper surface S1 of the short electronic card 30 has two cavities 16, for instance. As shown in FIG. 2, the first horizontal surface H1 of each of the buckling portions 112 has a protrusion 114 corresponding to one of the two cavities 16 respectively, such that the protrusion 114 is buckled into the corresponding one of the two cavities 16.

On the other hand, the locking slice 120 has a second horizontal surface H2 and a second vertical surface V2. The second vertical surface V2 is connected to the first horizontal surface H1 of one of the buckling portions 112, and the locking hole 122 passes through the second horizontal surface H2, such that the locking member 130 can pass through the locking hole 122 from the top.

A schematic side view of a socket housing 40 is provided in FIG. 1. The socket housing 40 is installed in a groove C of the housing 10 for accommodating the long electronic card 20 and the short electronic card 30. The socket housing 40 has a first socket 42 and a second socket 44. The long electronic card 20 and the short electronic card 30 are respectively inserted into the first socket 42 and the second socket 44 in a parallel manner to achieve electrical connection. According to an embodiment depicted in FIG. 3, when the short electronic card 30 is superposed on the long electronic card 20, a free end E of the short electronic card 30 is buckled by the pressing plate 110 and fixed by the locking slice 120. The locking member 130 is correspondingly locked into the second fixing hole 14. On the contrary, in another embodiment depicted in FIG. 4, when the long electronic card 20 is superposed on the short electronic card 30, a free end E of the long electronic card 20 is buckled by the pressing plate 110 and fixed by the locking slice 120. The locking member 130 is correspondingly locked into the first fixing hole 12. Hence, both the long electronic card 20 and the short electronic card 30 can be fixed by the fixing structure 100.

Based on the above, when a user intends to insert two standards of electronic cards into the socked housing 40, the lower electronic card is first inserted into a lower socket 42, and the upper electronic card is then inserted into an upper socket 44. At this time, it is not necessary for cavities 16 (the locking holes) to be aligned (note that the cavities 16 are located at the free ends corresponding to the inserted ends of the upper and the lower electronic cards). The free end of the upper electronic card is buckled by the pressing plate 110, and the locking slice 120 is fixed onto the first fixing hole 12 or the second fixing hole 14 of the housing 10 by the locking member 130. As such, when a striking force is applied to the upper electronic card, the upper electronic card is not removed, and reliability of the entire assembly can be improved.

In light of the foregoing, the electronic cards with two standards, e.g. the WNIC and the video card with the standard length and the relatively short length, can be fixed with use of the fixing structure of the invention. Thereby, the defect that the locking holes of the two conventional standards of electronic cards cannot be aligned and screwed when the two electronic cards are placed in a parallel manner can be rectified. Besides, the original structural design is not changed when the fixing structure of the invention is applied, thus facilitating the use of devices employing the fixing structure of the invention.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A fixing structure for an electronic card, the fixing structure being suitable for mounting a long electronic card or a short electronic card within a housing, the fixing structure comprising:

a pressing plate, two ends of the pressing plate having two buckling portions;

a locking slice connecting an end of the pressing plate and having a locking hole, the locking slice leaning against the housing; and a locking member passing through the locking hole and being fixed into a first fixing hole or a second fixing hole of the housing, wherein the two buckling portions are fixed onto a free end of the long electronic card when the locking hole corresponds to the first fixing hole, or the two buckling portions are fixed onto a free end of the short electronic card when the locking hole corresponds to the second fixing hole.

2. The fixing structure as claimed in claim 1, wherein the pressing plate and the locking slice are integrally formed by a plate body.

3. The fixing structure as claimed in claim 1, wherein the housing has a groove, and a socket housing is installed in the groove for accommodating the long electronic card and the short electronic card.

4. The fixing structure as claimed in claim 3, wherein the socket housing has a first socket and a second socket, and the long electronic card and the short electronic card are inserted into the first socket and the second socket in a parallel manner.

5. The fixing structure as claimed in claim 4, wherein the free end of the short electronic card is buckled by the pressing plate and fixed by the locking slice when the short electronic card is superposed on the long electronic card.

6. The fixing structure as claimed in claim 4, wherein the free end of the long electronic card is buckled by the pressing plate and fixed by the locking slice when the long electronic card is superposed on the short electronic card.

7. The fixing structure as claimed in claim 1, wherein each of the two buckling portions has a first horizontal surface and a first vertical surface respectively buckled on an upper surface and a side surface of the long electronic card or respectively buckled on an upper surface and a side surface of the short electronic card.

8. The fixing structure as claimed in claim 7, wherein the upper surface of the long electronic card or the upper surface of the short electronic card has two cavities, the first horizontal surface of each of the two buckling portions has a protrusion corresponding to one of the two cavities, such that the protrusion is buckled into the corresponding one of the two cavities.

9. The fixing structure as claimed in claim 7, wherein the locking slice has a second horizontal surface and a second vertical surface, the second vertical surface is connected to the first horizontal surface of one of the two buckling portions, and the locking hole passes through the second horizontal surface.

10. The fixing structure as claimed in claim 1, wherein the long electronic card is a wireless network interface card or a video card.

11. The fixing structure as claimed in claim 1, wherein the short electronic card is a wireless network interface card or a video card.

* * * * *